UNITED STATES PATENT OFFICE.

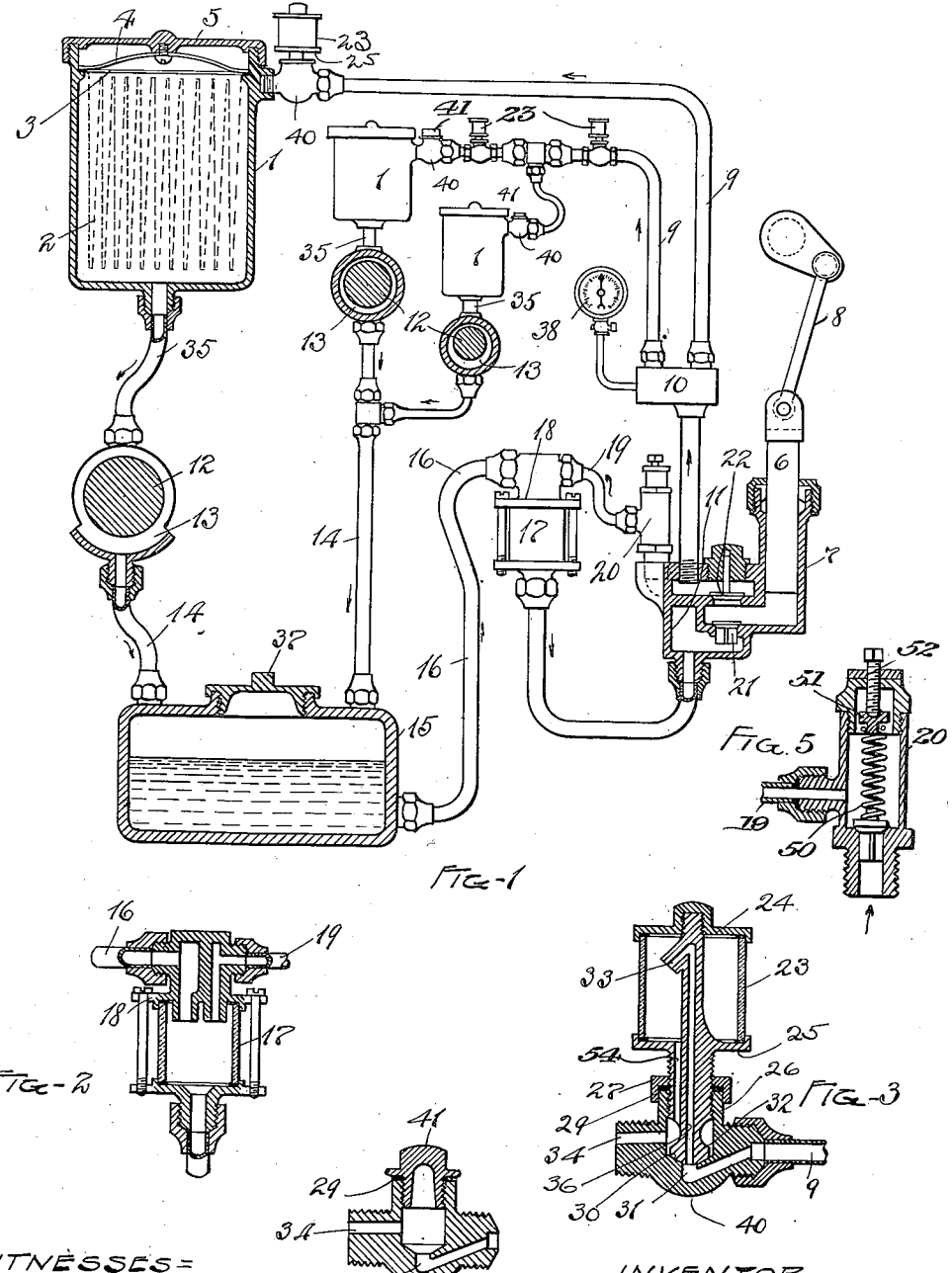

WILLIAM L. MORRIS, OF FORT WAYNE, INDIANA.

LUBRICATING MECHANISM.

1,227,481.  Specification of Letters Patent.  Patented May 22, 1917.

Application filed December 19, 1912. Serial No. 737,633.

*To all whom it may concern:*

Be it known that I, WILLIAM L. MORRIS, a citizen of the United States, and a resident of Fort Wayne, county of Allen, and State of Indiana, have invented a new and useful Improvement in Lubricating Mechanism, of which the following is a specification, the principle of the invention being herein explained and the best mode in which I have contemplated applying that principle, so as to distinguish it from other inventions.

The present invention relates to a lubricating system designed to provide a means for accurately regulating the amounts of lubricant fed to a number of bearing surfaces. The present methods of lubrication are admittedly wasteful, for while the various feed lines are roughly designed to convey the correct amounts of lubricant, yet the amount cannot be accurately limited by such means, nor are any means ordinarily provided for determining the existence of a leak. It is the prime object of the present invention to provide sensitive means, capable of an initial accurate adjustment, for limiting the flow to each bearing, and to further provide for the instant detection of a break or stoppage at any point in the feed line. By adjustment I refer to the limitation on the flow which may be imposed by the filtering means to be hereinafter described. The saving of all surplus lubricant is also provided for and means are supplied for giving the user the same security against a break in this portion of the system as elsewhere.

The means which I use to accurately limit the flow through feed line are preferably filtering means which are designed to regulate with great accuracy the amount of lubricant which passes. The filters are provided with indicating means such as a gage for showing the pressure which exists in the filter chambers, an increase in pressure giving notice of a stoppage in the filter. In each feed line and in the return line I place a sight feed from which the user may learn the amount flowing and be advised of any leakage or shortage of lubricant.

The filters are formed of suitable flow-resisting or impeding material and serve the double purpose of purifying the lubricant and of regulating the amount supplied. By interposing in each feed line a suitable amount of filter material, that is, a predetermined area of material, the flow in each line is accurately and permanently regulated, the only further requirement being that at proper intervals the filters be removed and cleaned of the deposit. To this end they are made removable. To the accomplishment of the foregoing and related ends, said invention, then, consists of the means hereinafter fully described, and particularly pointed out in the claims.

The annexed drawing and the following description set forth in detail certain mechanism embodying the invention, such disclosed means constituting, however, but one of the various mechanical forms in which the principle of the invention may be used.

In said annexed drawing:—

Figure 1 is a somewhat diagrammatic view indicating the relative positions and connections of the different parts of the lubricating system; Figs. 2, 3, 4 and 5 are central vertical sections showing details of construction.

In Fig. 1 there are shown a plurality of filter chambers 1, in which there are removably mounted filtering screens 2 formed of suitable flow resisting material, each such screen being adapted to permit the passage of a predetermined amount of lubricant. Each screen is attached to a ring 3 at its top, the ring 3 resting on a shoulder formed in the chamber 1 and being held thereon by a spring retainer 4 mounted on the removable cap 5. Each filter chamber is connected to pump mechanism which, as here shown, consists of a piston 6 reciprocably mounted in a cylinder 7 and driven by a connecting rod 8. Feed lines or tubes 9 connect the filters to said pump, said feed lines leading preferably from a manifold 10 which has a single line leading from a valve chamber 11 attached to the pump. A plurality of bearings 12 are designed to be lubricated, one filter being provided for each of the bearings and being connected thereto by means of feed lines 35 of suitable size. As is indicated in the figure, each filter chamber is proportioned to the size of the bearing surface to be lubricated, and the filter itself is suitably designed to permit the passage therethrough of sufficient lubricant for the bearing. Beneath each bearing, there is disposed a cup-shaped member 13 adapted to receive the surplus lubricant from the bearing and to convey it through tubes 14 to a drain chamber 15, suitably connected to the tubes 14 at the lowest point of the lubricating system.

The return feed from the bearings is, therefore, purely by gravity.

The filters are preferably formed of the same material, the resistance of which is known. Therefore, the amount of lubricant carried by each tube can be accurately controlled by the area of filter material placed in the line.

A tube 16 is provided connecting the pump chamber 11 with the drain chamber 15, and a sight feed is interposed in this pipe for the purpose of indicating to the user the flow from the drain chamber to the pump. This sight feed (see Fig. 2) consists preferably of a glass cylinder 17 provided with a removable top 18 having two separate vertical passages formed therein, one passage connecting to the tube 16 and the other to a tube 19 which leads to an automatic regulating valve 20, such valve being connected directly to the pump chamber. The lubricant will ordinarily return to the pipe 16 and the sight feed 17, it passing down the left vertical passage in the cover of the sight feed and thence to the pipe 16. Should the pump pressure increase on account of dirty filters the lubricant will back up from the pump lines into the valve 20 which is controlled by a spring 50 and is adapted to open at a given pressure permitting the lubricant to pass through the sight feed to the pump. The sight feed 17 is a double valve showing how much oil is returning to the pump from the bearings, and also how much is returned direct through the valve 20. The valve 20 may be adjusted, if desired, by a plunger 51 and a bolt 52. The valve chamber 11 of the pump has two check valves 21 and 22, the former admitting lubricant to the chamber from the drain pipe 16 upon upward movement of the piston, and the latter allowing the entrance of the lubricant into the feed lines.

In each of the feed lines 9 there may be attached on the pump side of the filter chamber a second sight feed, consisting of a glass cylinder 23 provided with a removable top 24 and a detachable bottom 25. Convenient attachment of these sight feeds is secured by adapting the bodies 40 of the same to remain in the line so long as the system is assembled, a plug 41 being provided to close the top of the bottom member when a sight feed is not used. The construction of the bottom and plug is shown in Fig. 4. The removable bottom 25 of the sight feed is threaded, adapting it to enter a threaded extension in a nozzle 26, which is a part of the body member already described, the latter being attached directly to the filter chamber. The lower shank of the sight feed screws into the body 40, and a collar 27 threaded on the shank holds packing material 29 against the body 40. These packing strips 29 interposed between the collar and the extension serve to make this joint perfectly tight. The nozzle 26 is provided with a valve seat 30 disposed concentrically around a passage 31 through the nozzle. The bottom 25 terminates in a member 32 which is adapted to contact the seat 30 and as the bottom 25 is provided with a central opening or passage 36 the lubricant entering the nozzle through the pipe 9 is forced through the central tube and into the glass cylinder through an opening 33. The lubricant is returned to the nozzle 26 and to the feed line, by means of an opening 34 and a second passage 54, the latter being disposed in the bottom member 25 parallel to the opening 36. For convenience I show but one feed line in the main figure equipped with a sight feed, but it will be understood that any or all of the lines may be so provided.

The drain chamber 15 is provided with a removable cap 37, and at some suitable point in the feed line a gage 38 is provided in order that the user may see clearly the pressure which is being maintained in the system.

The present system can be accurately fitted to supply any number of bearing surfaces with any required amount of lubricant, the pump being designed to maintain a pressure sufficient to force a given quantity of lubricant at every stroke of the pump through the filter surfaces, and the various surfaces being so relatively proportioned that of such total amount of lubricant each bearing will receive its predetermined part. When installed, no adjustment can be made except by a substitution of new filters, thus preventing any offhand adjustment by unskilled users which is the cause of many difficulties in the usual oiling systems. The safety valve 20 prevents, however, any injury to the system through an increase of pressure caused by dirty filters, as this valve by-passes the excess lubricant back to the pump and also gives notice in the sight feed 17 that such is being done.

The advantages of the present system are a close regulation of the feed to each of the bearings, such regulation being automatic by means of the filter members, and means for determining whether the feed is maintained at a suitable pressure. These means include the sight feeds and the gage, and are supplemented by the automatic regulator valve and sight feed on the return line.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the class described, the combination of circulating means, a plurality of conduits connected thereto, and a flow-impeding element in the form of a filter interposed in each of said conduits and adapted to regulate the flow therethrough.

2. In mechanism of the class described, the combination of circulating means, a plurality of conduits connected thereto, and flow-impeding elements in each of said conduits, said elements being adapted to maintain their relative resistance capacities while increasing their individual resistance capacities.

3. In mechanism of the class described, the combination of circulating means, a plurality of conduits connected thereto; a flow-impeding filter of known resistance interposed in each of said conduits and adapted to regulate the flow therethrough; and pressure-indicating means adapted to indicate the pressure upon said filters.

4. In mechanism of the class described, the combination of circulating means, a plurality of conduits connected thereto; flow-impeding filters of known resistance interposed in said conduits and adapted to regulate the flow in each, said filters being adapted to maintain their relative resistance capacities while increasing their individual resistance capacities.

5. In mechanism of the class described, the combination of pump mechanism; a plurality of tubes connected thereto and to bearing surfaces to be lubricated; a drain chamber connected to each of such bearing surfaces and adapted to receive the excess lubricant; a tube connecting said drain chamber with said pump; a sight feed device connected to said tube; and pressure-regulating means connected to said sight feed device and to said tubes extending from said pump.

6. In mechanism of the class described, the combination with a plurality of conduits each connected to a predetermined amount of bearing surface; of a plurality of filters connected in said conduits, all of said filters being of the same material and resistance power and having different cross-sectional areas corresponding with predetermined portions of the total amount of lubricant which it is desired to pass through their respective conduits; and pump mechanism adapted to supply lubricant to said conduits at a pressure sufficient to force the total predetermined amount of lubricant through said conduits against the combined normal resistances of said flow-impeding members.

7. In mechanism of the class described, the combination with a plurality of conduits each connected to a predetermined amount of bearing surface; of a plurality of filters connected in said conduits, all of said filters being of the same material and resistance power and having different cross-sectional areas corresponding with predetermined portions of the total amount of lubricant which it is desired to pass through their respective conduits; pump mechanism adapted to supply lubricant to said conduits at a pressure sufficient to force the total predetermined amount of lubricant through said conduits against the combined normal resistances of said flow-impeding members; and means adapted to relieve the pressure in said conduits upon an increase in the resistance of said flow-impeding members.

8. In mechanism of the class described, the combination with a plurality of conduits each connected to a predetermined amount of bearing surface; of a plurality of filters connected in said conduits, all of said filters being of the same material and resistance power and having different cross-sectional areas corresponding with predetermined portions of the total amount of lubricant which it is desired to pass through their respective conduits; and pump mechanism adapted to supply lubricant to said conduits at a pressure sufficient to force the total predetermined amount of lubricant through said conduits against the combined normal resistances of said flow-impeding filters.

9. In mechanism of the class described, the combination with a plurality of conduits each connected to a predetermined amount of bearing surface; of a plurality of filters connected in said conduits, all of said filters being of the same material and resistance power and having different cross-sectional areas corresponding with predetermined portions of the total amount of lubricant which it is desired to pass through their respective conduits; pump mechanism adapted to supply lubricant to said conduits at a pressure sufficient to force the total predetermined amount of lubricant through said conduits against the combined normal resistances of said flow-impeding filters; and means adapted to relieve the pressure in said conduits upon an increase in the resistance of said flow-impeding filters.

10. In mechanism of the class described, the combination with a plurality of conduits each connected to a predetermined amount of bearing surface; of a plurality of filters connected in said conduits, all of said filters being of the same material and resistance power and having different cross-sectional areas corresponding with predetermined portions of the total amount of lubricant which it is desired to pass through their respective conduits; pump mechanism adapted to supply lubricant to said conduits at a pressure sufficient to force the total predetermined amount of lubricant through said conduits against the combined normal resistances of said flow-impeding filters; a conduit connecting said first-named conduits to the intake of said pump mechanism; and a pressure actuated valve normally closing said last-named conduit but adapted to open and relieve the pressure in said conduits upon an increase in the resistance of said flow-impeding filters.

11. In mechanism of the class described, the combination with a plurality of conduits; of flow-impeding filters connected in each of said conduits, said filters being adapted to permit predetermined portions of the total amount of lubricant supplied to pass through their respective conduits; pump mechanism adapted to supply lubricant to said conduits at a pressure sufficient to force the total predetermined amount of lubricant through said conduits against the combined normal resistances of said flow-impeding filters; a conduit connecting said first-named conduits to the intake of said pump mechanism; and a pressure actuated valve normally closing said last-named conduit but adapted to open and relieve the pressure in said conduits upon an increase in the resistance of said flow-impeding filters.

Signed by me this 16th day of Dec., 1912.

WILLIAM L. MORRIS.

Attested by—
 V. ALLION,
 ALBERT J. PRANGER.

DISCLAIMER 1,227,481.—*William L. Morris*, Fort Wayne, Ind. LUBRICATING MECHANISM. Patent dated May 22, 1917. Disclaimer filed May 20, 1931, by the assignee, *Auto Research Corporation*.

Hereby enters disclaimer to the combination of elements covered by claim 2 of said patent aforesaid except when said flow-impeding elements have diverse relative resistance capacities, maintained in such relative diversity as to be proportionate to the requirements of the bearings served thereby.

[*Official Gazette June 16, 1931.*]